United States Patent [19]
Connors et al.

[11] Patent Number: 6,020,422
[45] Date of Patent: Feb. 1, 2000

[54] AQUEOUS DISPERSION POLYMERS

[75] Inventors: Edward J. Connors, Conshohocken; Michelle L. Cotter, Feasterville; Fu Chen, Newtown, all of Pa.

[73] Assignee: BetzDearborn Inc., Trevose, Pa.

[21] Appl. No.: 08/749,875

[22] Filed: Nov. 15, 1996

[51] Int. Cl.[7] .................................................. C08L 1/00
[52] U.S. Cl. .......................... 524/716; 524/700; 524/710; 524/711; 524/723; 524/732; 524/733; 524/734; 524/735; 524/745; 524/555; 526/200
[58] Field of Search ................................. 524/723, 732, 524/733, 734, 735, 745, 555, 700, 710, 711, 716; 526/200

[56] References Cited

U.S. PATENT DOCUMENTS

| | | | |
|---|---|---|---|
| 2,508,341 | 5/1950 | Wilson | 524/732 |
| 2,691,003 | 10/1954 | Bouvier et al. | 524/732 |
| 3,770,674 | 11/1973 | Araki et al. | 524/732 |
| 3,862,924 | 1/1975 | Hamann et al. | 260/88.1 PA |
| 3,954,724 | 5/1976 | Nakashio et al. | 524/732 |
| 4,164,612 | 8/1979 | Suzuki et al. | 526/62 |
| 4,228,264 | 10/1980 | Yamamoto et al. | 526/200 |
| 4,380,600 | 4/1983 | Hosoda et al. | 524/457 |
| 4,532,273 | 7/1985 | Kadowaki et al. | 523/402 |
| 4,532,295 | 7/1985 | Brabetz et al. | 524/827 |
| 4,650,848 | 3/1987 | Schulz et al. | 526/287 |
| 4,883,850 | 11/1989 | Craig | 526/200 |
| 4,929,655 | 5/1990 | Takeda et al. | 524/458 |
| 5,006,590 | 4/1991 | Takeda et al. | 524/458 |
| 5,045,587 | 9/1991 | Tanaka | 524/310 |
| 5,147,907 | 9/1992 | Rinck et al. | 524/48 |
| 5,294,347 | 3/1994 | Byrne et al. | 210/708 |
| 5,330,650 | 7/1994 | Byrne et al. | 210/708 |
| 5,332,506 | 7/1994 | Marble et al. | 210/705 |
| 5,332,507 | 7/1994 | Braden et al. | 210/708 |
| 5,358,998 | 10/1994 | Wendel et al. | 524/734 |
| 5,362,827 | 11/1994 | Bock et al. | 526/219.2 |
| 5,430,092 | 7/1995 | Aydin et al. | 524/458 |
| 5,442,006 | 8/1995 | Aydin et al. | 524/457 |
| 5,516,852 | 5/1996 | Kuo et al. | 525/340 |
| 5,667,848 | 9/1997 | Wuestfeld et al. | 524/732 |
| 5,686,024 | 11/1997 | Dahanayake et al. | 524/457 |

FOREIGN PATENT DOCUMENTS

| | | | |
|---|---|---|---|
| 765574 | 8/1971 | Belgium | 524/732 |
| 0364175B1 | 4/1990 | European Pat. Off. | C08F 220/34 |
| 0183466 B1 | 8/1990 | European Pat. Off. | C08F 2/10 |
| 0630909 A1 | 12/1994 | European Pat. Off. | C08F 2/06 |
| 0657478 A2 | 6/1995 | European Pat. Off. | C08F 220/56 |
| 53502 | 3/1982 | Japan | 524/732 |
| 15471 | 1/1985 | Japan | 524/732 |
| 3103404 | 4/1991 | Japan | 524/732 |

*Primary Examiner*—Judy M. Reddick
*Attorney, Agent, or Firm*—Steven D. Boyd

[57] ABSTRACT

Water soluable, aqueous salt solution dispersible polymers and aqueous salt solutions containing dispersed polymers are produced by polymerization of ethylenically unsaturated soluble monomers in an aqueous salt solution in the presence of at least one carbohydrate. The polymers and aqueous salt solutions containing the dispersed polymers are useful for paper making, water clarification and emulsion breaking.

48 Claims, No Drawings

AQUEOUS DISPERSION POLYMERS

FIELD OF THE INVENTION

The present invention relates to dispersible polymers. More particularly, the present invention relates to water soluble, aqueous salt solution dispersible polymers; to water soluble polymers dispersed in an aqueous salt solution; and to methods of making and methods of using said polymers.

BACKGROUND OF THE INVENTION

Cationic polyacrylamides are used extensively in numerous water and process treatment applications. Their high molecular weight and variable charge density make them extremely useful as flocculants for liquid/solid separation, as flotation aids and de-emulsifiers for oil/water clarification and as retention and drainage aids in paper manufacture. The high solution viscosity associated with these polymers when dissolved in water generally precludes their handling as aqueous solutions due to the low active content (usually less than 6%) which can be obtained. As a result, cationic polyacrylamides have generally been handled as either dry powders or water-in-oil emulsions. Due to increasing environmental concerns surrounding the oil and surfactants in emulsions as well as the inconvenience and expense associated with feeding dry powders, efforts to develop alternative delivery systems for these polymers have intensified in recent years.

The goal of these efforts has been to develop delivery systems, in liquid form, having high active content, which do not contain hydrocarbon oil or volatile organic components (VOCs) and which perform comparably to analogous emulsion and powder polymer products.

RELATED ART

U.S. Pat. No. 4,929,655 to Takeda et al. discloses a process for the production of a water soluble dispersion which includes polymerization of 5 to 100 mole percent of a water soluble cationic monomer represented by the following formula (I) which has a benzyl functionality, 0 to 50 mole % of another cationic monomer represented by the following formula (II) and 0 to 95 mole percent (meth) acrylamide in the presence of 1 to 10% by weight of an organic high molecular weight multivalent cation dispersant comprising a water soluble polymer produced from at least one monomer of formula (II); based on the total weight of the monomers, in an aqueous multivalent anionic salt solution which has a concentration of 15% by weight or more. Formula I has the formula:

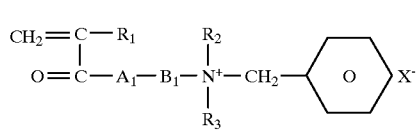

(I)

where $R_1$ is either hydrogen or $CH_3$; $R_2$ and $R_3$ are each an alkyl group having 1 to 3 carbon atoms; $A_1$ is either an oxygen atom or NH; $B_1$ is either an alkylene group having 2 to 4 carbon atoms or a hydroxypropylene group, and $X^-$ is an anionic counterion. Formula II has the formula:

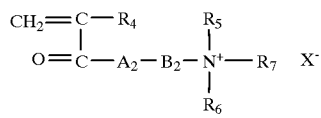

(II)

where $R_4$ is either hydrogen or $CH_3$; $R_5$ and $R_6$ are each an alkyl group having 1 to 2 carbon atoms; $R_7$ is a hydrogen atom or an alkyl group having 1 to 2 carbon atoms; $A_2$ is either an oxygen atom or NH; $B_2$ is either an alkylene group having 2 to 4 carbon atoms or a hydroxypropylene group and $X^-$ is an anionic counterion. A polyol, such as glycerin or ethylene glycol can also be used to enhance polymer deposition.

U.S. Pat. No. 5,006,590, Takeda et al. and EP 364175 are similar to Takeda '655, except that polymerization is carried out in the presence of both: (1) a water soluble cationic seed polymer which is insoluble in an aqueous solution of a polyvalent anionic salt; and (2) a water soluble cationic dispersant polymer which is soluble in an aqueous solution of a polyvalent anionic salt. The water soluble cationic seed polymer that is insoluble in the aqueous solution of polyvalent anionic salt contains at least 5 mole percent of cationic monomer units which have a benzyl functionality and are represented by the aforementioned general formula (I) above and the water soluble cationic dispersant polymer that is soluble in the aqueous solution of a polyvalent anionic salt contains at least 20 mole percent of cationic monomer units represented by the general formula (II) above.

EP 01 83466B1 to Takeda et al. is also similar to Takeda '655, except that a polyol soluble in an aqueous salt solution can be used as a substitute for or in addition to a polymer electrolyte dispersant. The disclosed method allows the production of polymer dispersions free of benzyl functional groups in the active polymer.

EP 0630909A1 discloses a process for preparing a water soluble polymer dispersion in which a portion of the monomer is fed to the reaction mixture after the polymerization reaction has been initiated to reduce the bulk viscosity of the reaction mixture during polymerization without a high loading of polyvalent salt.

EP 6574782A2 discloses that optimizing the multivalent anionic salt concentration controls the particle size and reduces the viscosity of water soluble polymer dispersions.

The prior art efforts generally have focused on polymer dispersions prepared from water soluble monomer mixtures containing at least 5 mole percent of a cationic monomer with an aromatic functional group, which is preferably a quaternary ammonium salt obtained by the reaction of benzyl chloride and dimethylaminoethyl acrylate (AEDBAC), in an aqueous solution of a polyvalent anion salt. The polymerization is carried out in the presence of a water soluble cationic acrylamide copolymer containing at least 5 mole percent of cationic monomer of the formula (I) and a water soluble cationic acrylamide copolymer containing at least 20 mole percent of cationic monomer of the formula (II). The polymer insoluble in salt solution acts as a seed polymer for the polymerization process wherein the brine soluble polymer acts as a polymeric dispersant for the resulting dispersion.

Thus prior art polymerization techniques can require significant raw material costs and time to produce seed and dispersant polymers having particular functional repeating units and molecular weight.

Therefore, a need exists for water-soluble polymer dispersions which can be produced in an economical and convenient process which does not require the prior synthesis of seed polymers having benzyl quaternary repeating units or dispersant polymers having quaternary ammonium alkylate repeating units.

Accordingly, it is an object of this invention to provide water soluble, salt dispersible polymers, processes of producing water soluble, salt dispersible polymers and processes of using water soluble, salt dispersible polymers which are free of the limitations found in prior art polymerization techniques.

SUMMARY OF THE INVENTION

To achieve the foregoing and other objects, the present invention provides water soluble polymers dispersed in an aqueous salt solution. The polymers are produced by polymerization of ethylenically unsaturated monomers in an aqueous salt solution in the presence of at least one carbohydrate.

In other embodiments, the invention provides water soluble polymers dispersed in an aqueous salt solution which are useful as drainage and retention aids in papermaking, for sludge dewatering and for flocculation of suspended solids.

DETAILED DESCRIPTION OF THE INVENTION

We have discovered that by using carbohydrates or carbohydrates and tannins or carbohydrates and cationically modified tannins in an aqueous salt solution, we can produce water soluble, aqueous salt solution dispersible polymers, with or without benzyl quaternary functionality in a reaction medium substantially free of seed polymers having benzyl quaternary repeating units and dispersant polymers having quaternary ammonium alkylate repeating units.

Thus we have have eliminated the need for time consuming and costly pre-synthesis of specific seed polymers having benzyl quaternary repeating units and dispersant polymers having quaternary ammonium alkylate repeating units.

In this invention, the monomers are polymerized in an aqueous solution containing salt, dilution water, at least one naturally occurring or chemically modified carbohydrate and/or tannin or cationically modified tannin and optionally branching agents and/or crosslinking agents. The onset of polymerization is evidenced by the change in appearance of the mixture from a clear solution to a milky white dispersion. The final product is in the form of a stable polymeric dispersion which readily dissolves in water to produce a viscous polymer solution. The details of the invention are described herein below.

I. The Carbohydrates and Tannins

Carbohydrates are compounds of carbon, hydrogen and oxygen that contain the saccharide unit or its reaction product. Carbohydrates useful in this invention include monosaccharides such as fructose and glucose, disaccharides such as sucrose, maltose, cellobiose and lactose; and polysaccharides. Polysaccharides are the preferred carbohydrates for use in this invention. Polysaccharides such as starch, cellulose and gums are particularly preferred.

Starch is a mixture of linear (amylose) and branched (amylopectin) naturally occurring polymers having the D-glucopyranosyl unit (glucose). It is the principle component of most plant seeds, tubes and roots and is produced commercially from corn, wheat, rice, tapioca, potato and other sources. Most commercial starch is produced from corn which is relatively inexpensive and abundant. Starch, as a polyhydroxy compound, may undergo many reactions characteristic of alcohols including esterification and etherification. For example, by reacting with metal hydroxides and alkylene oxides, various hydroxy alkyl starch derivatives such as hydroxyethyl and hydroxypropyl starches can be obtained. Cationic starches may be prepared from a starch slurry reacted with tertiary and quaternary alkyl amino compounds. The products are generally characterized as functional amine modified starches. Examples of cationically modified corn starch useful for the dispersions of this invention are Cato 31 and 237 which are available from National Starch and Chemical Company.

Cationic starches may also be obtained by reacting starches with cationic monomers such as 2-acryloxyethyltrimethyl ammonium chloride (AETAC), 2-acryloxyethyldimethylbenzyl ammonium chloride (AEDBAC) and 3-methacrylamidopropyltrimethyl ammonium chloride (MAPTAC), etc. or with certain cationic reagents such as N-(3-chloro-2-hydroxypropyl) trimethylammonium chloride (Quat 188, from Dow Chemical). Similar modifications can be applied to gum and other polysaccharides containing hydroxyl groups.

Gums are also polysaccharides, in general, that hydrate in hot or cold water to form viscous solutions or dispersions. The gums may be referred to as cellulose, mannans, galactomannans, and glucomannans, depending on the hexose(s) making up the backbone and side chains. Natural gums can be obtained from seaweed extract, plant exudates, seed or root, and by microbial fermentation. Seaweed extracts include agar and carrageenan gums from certain marine algae belonging to the class Rhodophyceae, red seaweed and algin or alginic acid from the class Phaeophyceae, brown seaweed. Plant exudates include gum Arabic, Karaya, Tragacanth and Ghatti depending on the source of tree. Seed gums include guar gum derived from the seed of the guar plant, locust bean gum obtained from the leguminous evergreen plant or carob tree and others. Microbial gums such as dextran and xanthan gum are polysaccharides produced by microorganisms via a fermentation process.

Chemically modified gums include those such as low methoxyl pectin, propylene glycol alginate, triethanolamine alginate, carboxymethyl locust bean gum and carboxymethyl guar gum.

Examples of gums that may be used in this innovation are xanthan gum, such as Keltrol BT from Kelco, and cationic guar gum, such as Galactasol 80H4FDS from Aqualon, a Division of Hercules Inc.

Cellulose is the primary framework of most of plants. For industrial purposes, cellulose is derived mainly from cotton linters or wood pulp by either mechanical and chemical processes. Cellulose esters such as cellulose formate, acetate, propionate, butyrate, valerate, caproate, heptylate, caprate, laurate, myristate and palmitate are obtained by reaction with organic acids, anhydrides or acid chlorides. Cellulose ethers are derived from the reaction of cellulose with alkylating agents such as chloroacetic acid and alkylene oxides under basic conditions. The cellulose ethers include, but are not limited to anionic sodium carboxymethylcellulose (CMC) and nonionic hydroxyethylcellulose (HEC) and HEC modified with a long chain alkyl group, i.e. HMHEC (Hydrophobically Modified HEC). Cellulose ethers are available from Aqualon, under the trade name of Natrosol and Natrosol Plus.

Chitin is a glucosamine polysaccharide which is structurally related to cellulose and is a major structural element in the hard exoskeletons of insects and crustaceans. Chitin is also found in some yeasts, algea and fungi. Chitosan is a deacylated derivative of chitin. Both chitin and chitosan are expected to be useful in the practice of this invention.

The amount of polysaccharides used in the invention may be from about 0.01 to 10.0 weight percent, preferably from about 0.01 to 5.0 weight percent and most preferably from about 0.01 to 1.0 weight percent based on the total weight of the dispersion.

The carbohydrates discussed above may also optionally be used in combination with one or more tannins to prepare a stable dispersion. Tannins are a large group of water-soluble complex organic compounds that occur naturally in leaves, twigs, barks, wood and fruit of many plants and are generally obtained by extraction from plant matter. The composition and structure of tannins will vary depending on the source and method of extraction, but the generic empirical formula is represented by $C_{76}H_{52}O_{46}$. Examples of barks from which tannins can be derived are wattle, mangrove, oak, eucalyptus, hemlock, pine, larch and willow. Examples of woods are the quebracho, chestnut, oak and urunday. Examples of fruits are myrobalans, valonia, divi—divi, tara and algarrobilla. Examples of leaves are sumac and gambier. Examples of roots are canaigre and palmetto.

Cationically modified tannins can also be used in this invention. Cationically modified tannins are obtained by reacting tannins with cationic monomers such as but not limited to methyl chloride, benzyl chloride, and dimethyl sulfate quaternary salts of dimethylaminoethyl acrylate, diethylaminoethyl acrylate, dimethyl aminoethyl methacrylate, diethylaminoethyl methacrylate, dimethylaminopropyl acrylamide, and dimethylaminopropyl methacrylamide or diallyl dimethyl ammonium chloride.

The reaction products of tannins with formaldehyde and amines are also useful as polymerization reaction mixture components in this invention.

The preferred tannins for use in this invention are those extracted from quebracho, mimosa and sumac and cationically modified derivatives thereof.

The amount of tannins used in the invention may be from up to 5 weight percent, preferably from about 0.005 to 2.5 weight percent and most preferably from about 0.01 to 1.0 weight percent based on the total weight of the dispersion II. The Salts The salts useful in this invention are monovalent metal salts, polyvalent metal salts or mixtures thereof. The salt is present to precipitate the polymer from the aqueous salt solution reaction mixture. The salts include but are not limited to salts having anions selected from the group of chloride, bromide, fluoride, sulfate and phosphate and cations selected from the group of ammonium, sodium, potassium, magnesium and aluminum. The concentration of salt in the aqueous salt solution is preferably at least 15% by weight based on the total weight of the dispersion.

III. Initiators

The polymerization may be initiated by a thermal or redox process via a free radical mechanism. Initiators suitable for the polymerization may be selected from peroxides, persulfates, bromates, and azo type initiators such as 2,2-azobis(2-amidinopropane)dihydrochloride (V-50, from Wako) and 2,2-azobis(N,N-dimethylene isobutyramidine) dihydrochloride (VA-044, from Wako), etc. Sulfites, bisulfites, sulfur dioxide and citrates and other reducing agents used with oxidizing initiators to form an initiating redox pair may also be used. The amount of initiator used may range from about 5 ppm to 1000 ppm based on the total weight of the monomers. The polymerization may also be initiated by a photochemical irradiation or by ionization radiation such as with a $Co^{60}$ source.

IV. Branching Agents

Branching agents may also optionally be used to branch and crosslink the polymers of this invention. Branching or crosslinking agents comprise compounds having either at least two double bonds, a double bond and a reactive group, or two reactive groups. Representative compounds include but are not limited to polyethyleneglycol di(meth) acrylate, methylene bis(meth)acrylamide, N-vinyl acrylamide, allyl glycidyl ether, glycidyl acrylate, glyoxal, glycidyl (meth) acrylate, divinylbenzene, N-methylallyacrylamide, triallylammonium salts, methylolacrylamide and the like may also be added, providing the resulting polymer is water soluble. It is to be understood that the aforementioned materials do not in any way limit the synthesis of polymers according to this invention. Any of the well known chain transfer agents familiar to those skilled in the art may be used to control the polymer molecular weight. Those include, but are not limited to, lower alkyl alcohols such as isopropanol, amines, mercaptans, phosphites, thioacids, allyl alcohol and the like.

V. The Reaction Medium

The polymerization of monomers of the present invention is carried out in a reaction medium comprising water, at least one salt as described in II above, and at least one carbohydrate or at least one carbohydrate and a tannin as described in I above. The reaction medium can contain a polymerization initiator as detailed in III above and can optionally contain a branching agent as described in IV above.

The reaction medium can also optionally contain seed polymers, including seed polymers having benzyl quaternary repeating units and dispersant polymers, including dispersant polymers having quaternary ammonium alkylate repeating units. However the preferred reaction medium is substantially free of seed polymers having benzyl quaternary repeating units and free of dispersant polymers having quaternary ammonium alkylate repeating units.

In the preferred embodiment of this invention, the reaction medium contains at least one salt, at least one carbohydrate, a tannin and a polymerization initiator.

VI. The Monomers

The monomers suitable for use in this invention can be nonionic, hydrophobic or cationic monomers with or without a benzyl quaternary functionality. The monomers are selected from the groups (i) hydrophobic monomers such as N-alkyl acrylamides, N-alkyl methacrylamides, N,N-dialkyl acrylamides, N,N-dialkyl methacrylamides, alkyl acrylates, alkyl methacrylates and alkylstyrenes having 1 to 16 carbon atoms in the alkyl group; suitable hydrophobic monomers may also include dodecyl methacrylate, tridecyl acrylate, tridecyl methacrylate, octadecyl acrylate, octadecyl methacrylate, ethyl half ester of maleic anhydride, diethyl maleate, and other alkyl esters derived from the reactions of alkanols having from 1 to 16 carbon atoms with ethylenically unsaturated carboxylic acids such as acrylic acid, methacrylic acid, maleic anhydride, fumaric acid, itaconic acid and aconitic acid, alkylaryl esters of ethylenically unsaturated carboxylic acids such as nonyl-α-phenyl acrylate, nonyl-α-phenyl methacrylate, dodecyl-α-phenyl acrylate and dodecyl-α-phenyl methacrylate; N-alkyl ethylenically unsaturated amides such a N-isopropyl acrylamide, N-tertiary butyl acrylamide, N,N-dimethylacrylamide, N-octadecyl acrylamide, N-octadecyl methacrylamide, N,N-dioctyl acrylamide and similar derivatives thereof; vinyl alkylates such as vinyl laurate and vinyl stearate, vinyl alkyl ethers such as dodecyl vinyl ether and hexadecyl vinyl ether; N-vinyl amides such as N-vinyl lauramide and N-vinyl stearamide; (ii) monomers represented by the formula:

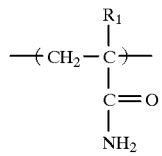

wherein $R_1$ is H or a $C_1$ to $C_3$ alkyl; and (iii) monomers represented by the formula:

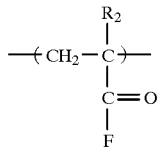

wherein $R_2$ is H or a $C_1$ to $C_3$ alkyl, F is a $NHR_3N+(R_{4,5,6})M-$ or $OR_3N+(R_{4,5,6})M-$ $R_3$ is a $C_1$ to $C_4$ linear or branched alkylene group, $R_4$, $R_5$ and $R_6$ are hydrogen, $C_1$ to $C_4$ linear or branched alkyl groups, $C_5$ to $C_8$ cycloalkyl groups, aromatic or alkylaromatic groups, and $M-$ is chloride, bromide, fluoride, iodide or methyl or hydrogen sulfate.

Preferably, the group (i) hydrophobic monomer is an N-alkyl acrylamide such as N-isopropyl acrylamide and N-tertiary butyl acrylamide or an N,N-dialkyl acrylamide having about 1 to 8 carbon atoms in the alkyl group such as N,N dimethyl acrylamide.

The preferred group (ii) monomers include nonionic monomers such as acrylamide and $C_1$ to $C_3$ alkyl acrylamides.

The preferred group (iii) monomers are cationic monomers such as 2-acryloxyethyltrimethyl ammonium chloride (AETAC), 2-methacryloxyethyltrimethyl ammonium chloride (METAC)

2-acryloxyethyldimethylbenzyl ammonium chloride (AEDBAC), 2-methacryloxyethyltrimethyl ammonium chloride (MEDBAC)

3-methacrylamidopropyltrimethyl ammonium chloride (MAPTAC), 3-acrylamidopropyltrimethyl ammonium chloride (APTAC), and diallyl dimethyl ammonium chloride (DADMAC), etc.

In this invention, the most preferred monomers of group (I) are N-isopropyl acrylamide (IPAM) and N-tert-butyl acrylamide (t-BAM) as well as N,N-dimethyl acrylamide (DMAM). The most preferred monomers of group (ii) are acrylamide or methacrylamide; and the most preferred monomers of group (iii) are 2-acryloxyethyltrimethyl ammonium chloride (AETAC), 2-acryloxyethyldimethylbenzyl ammonium chloride (AEDBAC) or a mixture of AETAC and AEDBAC.

The copolymers produced by the polymerization process of this invention have the general structure represented by Z:

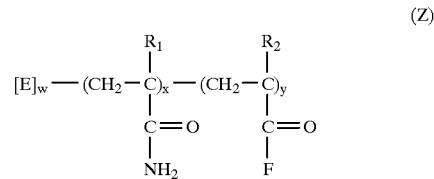

where E represents hydrophobic or water insoluble monomers such as N-alkyl acrylamides, N-alkyl methacrylamides, N,N-dialkyl acrylamides, N,N-dialkyl methacrylamides, alkyl acrylates, alkyl methacrylates and alkylstyrenes having 1 to 16 carbon atoms in the alkyl group such as dodecyl methacrylate, tridecyl acrylate, tridecyl methacrylate, octadecyl acrylate, octadecyl methacrylate, ethyl half ester of maleic anhydride, diethyl maleate, and other alkyl esters derived from the reactions of alkanols having from 1 to 16 carbon atoms with ethylenically unsaturated carboxylic acids such as acrylic acid, methacrylic acid, maleic anhydride, fumaric acid, itaconic acid and aconitic acid; alkylaryl esters of ethylenically unsaturated carboxylic acids such as nonyl-α-phenyl acrylate, nonyl-α-phenyl methacrylate, dodecyl-α-phenyl acrylate and dodecyl-α-phenyl methacrylate; N-alkyl unsaturated amides such a N-isopropyl acrylamide, N-tertiary-butyl acrylamide, N,N-dimethylacrylamide, N-octadecyl acrylamide, N-octadecylmethacrylamide, N,N-dioctyl acrylamide and similar derivatives thereof; vinyl alkylates such as vinyl laurate and vinyl stearate, vinyl alkyl ethers such as dodecyl vinyl ether and hexadecyl vinyl ether; N-vinyl amides such as N-vinyl lauramide and N-vinyl stearamide. Monomer x is a nonionic monomer such as acrylamide or alkylacrylamide. $R_1$ is H or a $C_1$ to $C_3$ alkyl. Monomer y is a cationic monomer. $R_2$ is H or a $C_1$ to $C_3$ alkyl; F is a $NHR_3N+(R_{4,5,6})M-$ or $OR_3N+(R_{4,5,6})M-$ $R_3$ is a $C_1$ to $C_4$ linear or branched alkylene group, $R_4$, $R_5$ and $R_6$ are hydrogen, $C_1$ to $C_4$ linear or branched alkyl groups, $C_5$ to $C_8$ cycloalkyl groups, aromatic or alkylaromatic groups, and $M-$ is chloride, bromide, fluoride, iodide or methyl or hydrogen sulfate.

The molar percentages of monomers w, x and y may vary over a wide range with the proviso that the sum of the molar percentages of w, x and y must add up to 100 molar percent. Preferably the mole percent of w is from about 0 to 60 mole percent, x is from about 20 to 95 mole percent and y is from about 5 to 80 mole percent. More preferably w is from about 0 to 40 mole percent, x is from about 20 to 80 mole percent and y is from about 20 to 40 mole percent.

It is to be understood that more than one kind of hydrophobic or cationic monomer may be present in the Formula Z. Although the preferred water soluble salt dispersible polymers produced by this invention are terpolymers, water soluble, salt dispersible homopolymers and copolymers can also be produced. Stable dispersions may be produced using a methyl chloride quaternary ammonium salt as the only cationic monomer. Copolymers of acrylamide with an N-alkyl acrylamide or N,N-dialkyl acrylamide monomer along with a methyl chloride quaternary cationic monomer and with or without a benzyl chloride quaternary cationic monomer may also be prepared in the form of stable aqueous dispersions. It is expected that dispersions with up to about 30% active polymer content may be prepared.

The number average molecular weight (Mn) of the polymer described above is not critical and may range from about 5,000 to 20,000,000 for desired applications.

The dispersions prepared by the teachings of this invention remain in liquid form for several months with no signs of separation or solidification. As such, the dispersions provide a convenient vehicle for the delivery of high molecular polymers in liquid form and are useful in many applications some of which are discussed in more detail later herein. The polymer may be further isolated via precipitation in a nonsolvent such as acetone and dried to a powder form for final use. Alternatively, the dispersion can be simply spray dried directly to obtain the polymers in powder form. In either case, the powder can be readily dissolved in an aqueous medium for use.

The polymers and the polymeric dispersions of this invention are useful in a variety of operations such as but not limited paper making, water clarification, and sludge dewatering.

VII. Paper Manufacturing

The dispersion polymers of the present invention are particularly useful as drainage and retention aids in paper making.

To enhance drainage and retention, an effective amount of the invention polymeric dispersion is added to an aqueous paper furnish containing pulp to drain water from the paper or paperboard while aiding the retention of fines in the paper or paperboard product. A microparticulate material can also be added in conjunction with the dispersed polymer of this invention to an aqueous paper furnish.

The microparticles, useful for drainage and retention processes with the invention polymers, have negative, positive or amphoteric charges and include siliceous materials, alumina compounds, phosphorous compounds, zinc compounds, titanium compounds, zirconium compounds, tin compounds, borium compounds and organic and inorganic polymeric microparticulates.

Preferred siliceous materials include colloidal silicas, clays including water swellable clays such as bentonite and non-swellable clays such as kaolin, water dispersible silica, silica gels, silica sols, precipitated silicas, silicic acid, silicates, and silica based microgels such as polysilicic acid, polysilicate and polymetal silicate microgels.

Furthermore, in the paper making system, the dispersion of the invention may be used in conjunction with cationic polymers such as acrylamide/dimethylaminoethyl (meth) acrylate methyl chloride quaternary (AETAC, METAC), diallyldimethyl ammonium chloride, epichlorohydrin/ dimethylamine/ethylenediamine, polyethylenimines, polyvinylamine and their copolymers and mixtures thereof and anionic polymers such as acrylamide/acrylic acid, acrylamide/2-acrylamido-2-methylpropanesulfonic acid copolymer or mixtures thereof as well as nonionic polymers comprising polyacrylamide, polyvinyl alcohol, polvinylacetate, and their copolymers and polystyrene beads.

The invention polymeric dispersions are also expected to be useful in other paper making operations such as processes to control stickies and pitch, deinking, recycled fiber clarification and the like. The dispersions are also expected to be useful in alkaline paper making operations.

VIII. Water Clarification

Water clarification is the removal of suspended matter from water by various methods to provide a water suitable for domestic or industrial purposes. The suspended matter can include materials such as suspended solids, emulsified hydrophobic hydrocarbons, proteinaceous matter, suspended paint, and the like. Removal is generally accomplished by coagulation, flocculation and sedimentation.

Coagulation is the process of destablization by charge neutralization. Once neutralized, suspended material no longer repel each other and can be brought together. Flocculation is the process of bringing together the destabilized or coagulated material to form a larger agglomeration or "floc". Sedimentation refers to the physical removal from suspension, or settling that occurs once the material has been coagulated and flocculated.

The dispersion polymers of this invention, w hen added to a aqueous system in sufficient amounts, can act as flocculation aids, dissolved air flotation aids and dewatering aids, by increasing floc size via charge site binding and molecular bridging.

The dispersion polymers can be used alone or in combination with other conventional flocculants and coagulants such as conventional polymers, clays, silicates and the like and are expected to be compatible with surfactants in breaking the oil-in-water or water-in-oil emulsions in the oil field, refinery, chemical and metal processing plants.

The invention is more particularly described by the following examples, which are to be regarded solely as illustrative, and not as restricting the scope of the invention.

EXAMPLES

In a typical dispersion preparation, the monomers, salt, dilution water, and carbohydrate are added to a 1000 cc resin kettle and mixed until completely dissolved. A chelating agent is then added to deactivate any polymerization inhibitor present in the monomers. The kettle is equipped with an overhead stirrer, reflux condenser, thermocouple, addition port with septum and a nitrogen sparge tube.

The mixture is generally mixed at 500–600 rpm and slowly heated to 50° C. A 1% aqueous solution of 2,2'-azobis (2-amidinopropane)dihydrochloride (V-50) or other suitable initiator is prepared and a portion of which is shot into the reactor to initiate the polymerization. At the start of the reaction, all of the components of the system are dispersible in the brine continuous phase so that the mixture is initially transparent or slightly hazy. The onset of polymerization is evidenced by a change in the appearance of the reaction mixture from clear to hazy. This change is consistent with the initiation of polymer chains in the brine continuous phase which are initially soluble at low molecular weight, but which precipitate from the brine as their molecular weight is increased. The carbohydrate materials provide an integral matrix in the dispersion polymerization system by preventing agglomeration of the precipitated polymer particles and by stabilizing the final dispersion. As the polymerization continues, the mixture becomes increasingly hazy until a milky white dispersion is obtained. The bulk viscosity of the mixture is generally seen to increase during the polymerization process, but typically remains below 5000 cps. Additional salt may be added during or after the polymerization process to reduce the bulk viscosity to less than 2600 cps and improve the stability. After heating the dispersion for several hours, a second shot of initiator may be added to reduce the residual monomer content. The mixture is then cooled to room temperature to yield a fine, white dispersion. The final dispersion dissolves rapidly into an aqueous solution upon addition to water with minimal agitation. Within minutes, a maximum solution viscosity is obtained.

Example 1

15/5/80 AEDBAC/AETAC/AM Aqueous Dispersion

To a 1000 cc reaction kettle was added 67.67 grams of acrylamide (AMD, 53% aqueous solution), 7.64 grams of dimethylaminoethyl acrylate methyl chloride quaternary (AETAC, 80% aqueous solution), 30.97 grams of dimethylaminoethyl acrylate benzyl chloride quaternary (AEDBAC, 82.4% aqueous solution), 90.00 grams of ammonium sulfate, 0.50 grams of diethylenetriamine pentaacetic acid, pentasodium salt (Versenex 80, 40% aqueous from Dow Chemicals), and 52.21 grams of deionized water. To 197.21 grams of boiling deionized water was added 0.77 grams of Galactasol 80H2C Guar Gum and 2.03 grams of Cato 31 Cationic Starch with mixing. The starch/gum solution was heated until dissolved and then added to the reaction kettle. The mixture was stirred until a homogeneous solution was obtained. The kettle was equipped with an overhead stirrer, thermocouple, reflux condenser, nitrogen sparge tube, addition port with septum and a heating mantle. The mixture was then heated to 50° C. under constant nitrogen sparge while stirring at 500 rpm. After reaching 50° C., 0.50 grams of a 1% aqueous solution of 2,2'-azobis(2-amidinopropane) dihydrochloride (Wako V-50) was added to the reactor. After approximately 90 minutes, another 0.50 grams of the V-50 solution was added. The temperature was held for six hours.

|  | Grams |
| --- | --- |
| AETAC (80%) | 7.64 |
| AEDBAC (82.4%) | 30.97 |
| Acrylamide (53%) | 67.67 |
| Galactasol 80H2C Guar Gum | 0.77 |
| Cato 31 Cationic Starch | 2.03 |
| DI Water | 249.42 |
| Ammonium Sulfate | 90.00 |
| Versenex 80 | 0.50 |
| Wako V-50 (1.0%) | 0.50 |
| Additional V-50 (after 90 min.) | 0.50 |
|  | 450.00 |

Final Actives Content -15.0%

The final product was in the form of a smooth, milky white dispersion with a bulk viscosity of 560 cps. A 0.5% solution of the active polymer in deionized (DI) water had a Brookfield viscosity of 237 cps.

Using the similar procedure and equipment described for Example 1, the following dispersions were prepared:

Example 2
15/5/80 AEDBAC/AETAC/AM Aqueous Dispersion

|  | Grams |
| --- | --- |
| AETAC (80%) | 8.47 |
| AEDBAC (82.4%) | 34.41 |
| Acrylamide (53%), | 75.20 |
| Galactasol 80H2C Guar Gum | 0.86 |
| Natrosol 250MHR (hydroxyethylcellulose) | 2.00 |
| DI Water | 283.00 |
| Ammonium Sulfate | 115.00 |
| Versenex 80 | 0.50 |
| Wako V-50 (1.0%) | 0.56 |
|  | 520.00 |

Final Actives Content - 14.4%

The final product was in the form of a smooth, milky white dispersion with a bulk viscosity of 1120 cps. A 0.5% solution of the active polymer in DI water had a Brookfield viscosity of 195 cps.

Example 3
20/40/38/2 AETAC/AM/DMAM/t-BAM Aqueous Dispersion

|  | Grams |
| --- | --- |
| AETAC (80%) | 30.43 |
| Acrylamide (53%) | 33.72 |
| N,N-dimethyl acrylamide (99%) | 23.89 |
| N-tert-butyl acrylamide (99%) | 1.62 |
| Galactasol 80H4FDS Guar Gum | 0.77 |
| Natrosol 250MHR (hydroxyethylcellulose) | 1.13 |
| DI Water | 267.44 |
| Ammonium Sulfate | 110.00 |
| Versenex 80 | 0.50 |
| Wako V-50 (1.0%) | 0.50 |
|  | 470.00 |

Final Actives Content - 14.4%

The final product was in the form of a smooth, milky white dispersion with a bulk viscosity of 2516 cps. A 0.5% solution of the active polymer in DI water had a Brookfield viscosity of 130 cps.

Example 4
20/40/38/2 AETAC/AM/DMAM/t-BAM Aqueous Dispersion

|  | Grams |
| --- | --- |
| AETAC (80%) | 30.43 |
| Acrylamide (53%) | 33.72 |
| N,N-dimethyl acrylamide (99%) | 23.89 |
| N-tert-butyl acrylamide (99%) | 1.62 |
| Galactasol 80H4FDS Guar Gum | 0.77 |
| Cato 237 Cationic Starch | 2.03 |
| DI Water | 251.54 |
| Ammonium Sulfate | 115.00 |
| Versenex 80 | 0.50 |
| Wako V-50 (1.0%) | 0.50 |
|  | 460.00 |

Final Actives Content - 14.7%

The final product was in the form of a smooth, milky white dispersion with a bulk viscosity of 1068 cps. A 0.5% solution of the active polymer in DI water had a Brookfield viscosity of 49 cps.

Example 5
20/40/38/2 AETAC/AM/DMAM/t-BAM Aqueous Dispersion

|  | Grams |
| --- | --- |
| AETAC (80%) | 30.43 |
| Acrylamide (53%) | 33.72 |
| N,N-dimethyl acrylamide (99%) | 23.89 |
| N-tert-butyl acrylamide (99%) | 1.62 |
| Galactasol 80H4FDS Guar Gum | 0.77 |
| Natrosol 250MHR (hydroxyethylcellulose) | 1.80 |
| DI Water | 266.77 |
| Ammonium Sulfate | 100.00 |
| Versenex 80 | 0.50 |
| Wako V-50 (1.0%) | 0.50 |
|  | 460.00 |

Final Actives Content - 14.7%

The final product was in the form of a smooth, milky white dispersion with a bulk viscosity of 1496 cps. A 0.5% solution of the active polymer in DI water had a Brookfield viscosity of 80 cps.

Example 6

30/10/60 AEDBAC/AETAC/AM Aqueous Dispersion

|  | Grams |
|---|---|
| AETAC (80%) | 12.71 |
| AEDBAC (80%) | 52.81 |
| Acrylamide (53%) | 42.22 |
| Galactasol 80H4FDS Guar Gum | 0.85 |
| Cato 31 Cationic Starch | 2.25 |
| DI Water | 298.16 |
| Ammonium Sulfate | 100.00 |
| Versenex 80 | 0.50 |
| Wako V-50 (1.0%) | 0.50 |
|  | 510.00 |

Final Actives Content - 14.7%

The final product was in the form of a smooth, milky white dispersion with a bulk viscosity of 360 cps. A 0.5% solution of the active polymer in DI water had a Brookfield viscosity of 115 cps.

Example 7

15/5/80 AEDBAC/AETAC/AM Aqueous Dispersion

|  | Grams |
|---|---|
| AETAC (80%) | 5.68 |
| AEDBAC (80%) | 23.79 |
| Acrylamide (53%) | 50.47 |
| Galactasol 80H2C Guar Gum | 1.00 |
| DI Water | 313.06 |
| Ammonium Sulfate | 105.00 |
| Versenex 80 | 0.50 |
| Wako V-50 (1.0%) | 0.50 |
|  | 500.00 |

Final Actives Content - 10.0%

The final product was in the form of a smooth, milky white dispersion with a bulk viscosity of 164 cps. A 0.5% solution of the active polymer in DI water had a Brookfield viscosity of 95.5 cps.

Example 8

30/10/60 AEDBAC/AETAC/AM Aqueous Dispersion

|  | Grams |
|---|---|
| AETAC (80%) | 8.47 |
| AEDBAC (80%) | 35.21 |
| Acrylamide (53%) | 28.15 |
| Galactasol 80H4FDS Guar Gum | 1.00 |
| DI Water | 326.17 |
| Ammonium Sulfate | 100.00 |
| Versenex 80 | 0.50 |
| Wako V-50 (1.0%) | 0.50 |
|  | 500.00 |

Final Actives Content - 10.0%

The final product was in the form of a smooth, milky white dispersion with a bulk viscosity of 136 cps. A 0.5% solution of the active polymer in DI water had a Brookfield viscosity of 44.5 cps.

Example 9

20/40/38/2 AETAC/AM/DMAM/t-BAM Aqueous Dispersion

|  | Grams |
|---|---|
| AETAC (80%) | 20.29 |
| Acrylamide (53%) | 22.48 |
| N,N-dimethyl acrylamide (99%) | 15.93 |
| N-tert-butyl acrylamide (99%) | 1.08 |
| Galactasol 80H4FDS Guar Gum | 0.77 |
| DI Water | 283.45 |
| Ammonium Sulfate | 105.00 |
| Versenex 80 | 0.50 |
| Wako V-50 (1.0%) | 0.50 |
|  | 450.00 |

Final Actives Content - 10.0%

The final product was in the form of a smooth, milky white dispersion with a bulk viscosity of 1644 cps. A 0.5% solution of the active polymer in DI water had a Brookfield viscosity of 52.0 cps.

Example 10

15/5/80 AEDBAC/AETAC/AM Aqueous Dispersion

|  | Grams |
|---|---|
| AETAC (80%) | 12.42 |
| AEDBAC (89%) | 50.52 |
| Acrylamide (53%) | 110.38 |
| Galactasol 80H2C Guar Gum | 0.55 |
| Cationically Modified Tannin (40%) | 1.62 |
| DI Water | 262.78 |
| Ammonium Sulfate | 129.98 |
| Versenex 80 | 0.50 |
| Wako V-50 (5.0%) | 1.25 |
|  | 570.00 |

Final Actives Content - 19.3%

The final product was in the form of a smooth dispersion with a bulk viscosity of 708 cps. A 0.5% solution of the active polymer in DI water had a Brookfield viscosity of 80.5 cps.

Example 11

20/40/40 AETAC/AM/DMAM Aqueous Dispersion

|  | Grams |
|---|---|
| AETAC (80%) | 50.04 |
| Acrylamide (53%) | 55.25 |
| N,N-dimethyl acrylamide (99%) | 41.20 |
| Galactasol 80H2C Guar Gum | 0.44 |
| Cationically modified Tannin (40%) | 4.13 |
| DI Water | 269.19 |
| Ammonium Sulfate | 148.00 |
| Versenex 80 | 0.50 |
| Wako V-50 (5.0%) | 1.25 |
|  | 570.00 |

Final Actives Content - 19.3%

The final product was in the form of a smooth dispersion with a bulk viscosity of 1024 cps. A 0.5% solution of the active polymer in DI water had a Brookfield viscosity of 35 cps.

Example 12

30/10/60 AEDBAC/AETAC/AM Aqueous Dispersion

|  | Grams |
| --- | --- |
| AETAC (80%) | 21.04 |
| AEDBAC (80%) | 88.05 |
| Acrylamide (53%) | 70.05 |
| Galactasol 80H2C Guar Gum | 0.55 |
| Cationically modified Tannin (40%) | 1.62 |
| DI Water | 256.96 |
| Ammonium Sulfate | 109.98 |
| Versenex 80 | 0.50 |
| Wako V-50 (5.0%) | 1.25 |
|  | 550.00 |

Final Actives Content - 22.6%

The final product was in the form of a smooth dispersion with a bulk viscosity of 820 cps. A 0.5% solution of the active polymer in DI water had a Brookfield viscosity of 42.0 cps.

Example 13

15/5/80 AEDBAC/AETAC/AM Aqueous Dispersion

|  | Grams |
| --- | --- |
| AETAC (80%) | 12.59 |
| AEDBAC (80%) | 52.16 |
| Acrylamide (53%) | 110.38 |
| Galactasol 80H2C Guar Gum | 0.55 |
| Tannin | 0.28 |
| DI Water | 262.29 |
| Ammonium Sulfate | 140.00 |
| Versenex 80 | 0.50 |
| Wako V-50 (5.0%) | 1.25 |
|  | 580.00 |

Final Actives Content - 19.0%

The final product was in the form of a smooth dispersion with a bulk viscosity of 884 cps. A 0.5% solution of the active polymer in DI water had a Brookfield viscosity of 69.5 cps.

Example 14

20/40/40 AETAC/AM/DMAM Aqueous Dispersion

|  | Grams |
| --- | --- |
| AETAC (80%) | 50.04 |
| Acrylamide (53%) | 55.25 |
| N,N-dimethyl acrylamide (99%) | 41.20 |
| Galactasol 80H2C Guar Gum | 0.44 |
| Tannin | 0.55 |
| DI Water | 272.77 |
| Ammonium Sulfate | 128.00 |
| Versenex 80 | 0.50 |
| Wako V-50 (5.0%) | 1.25 |
|  | 550.00 |

Final Actives Content - 20.0%

The final product was in the form of a smooth dispersion with a bulk viscosity of 750 cps. A 0.5% solution of the active polymer in DI waterhad a Brookfield viscosity of 21.0 cps.

Example 15

30/10/60 AEDBAC/AETAC/AM Aqueous Dispersion

|  | Grams |
| --- | --- |
| AETAC (80%) | 18.64 |
| AEDBAC (80%) | 77.85 |
| Acrylamide (53%) | 61.92 |
| Galactasol 80H2C Guar Gum | 0.55 |
| Tannin | 0.17 |
| DI Water | 299.12 |
| Ammonium Sulfate | 110.00 |
| Versenex 80 | 0.50 |
| Wako V-50 (5.0%) | 1.25 |
|  | 570.00 |

Final Actives Content - 19.3%

The final product was in the form of a smooth dispersion with a bulk viscosity of 84 cps. A 0.5% solution of the active polymer in DI water had a Brookfield viscosity of 44.0 cps.

Comparative Example 1

15/5/80 AEDBAC/AETAC/AM Aqueous Dispersion

|  | Grams |
| --- | --- |
| AETAC (80%) | 7.64 |
| AEDBAC (80%) | 31.90 |
| Acrylamide (53%) | 67.67 |
| DI Water | 251.79 |
| Ammonium Sulfate | 110.00 |
| Versenex 80 | 0.50 |
| Wako V-50 (1.0%) | 0.50 |
|  | 470.00 |

Final Actives Content - 14.4%

In the absence of carbohydrate in the dispersion medium, the precipitated polymer particles agglomerate during the polymerization. The system remains liquid under constant agitation, but rapidly separates when agitation is stopped. Within one hour after mixing is discontinued, the entire system separates into two phases yielding a clear brine layer and a polymer gel.

Comparative Example 2

30/10/60 AEDBAC/AETAC/AM Aqueous Dispersion (2194-43)

|  | Grams |
| --- | --- |
| AETAC (80%) | 12.71 |
| AEDBAC (80%) | 52.81 |
| Acrylamide (53%) | 42.22 |
| DI Water | 301.26 |
| Ammonium Sulfate | 110.00 |
| Versenex 80 | 0.50 |
| Wako V-50 (1.0%) | 0.50 |
|  | 510.00 |

Final Actives Content - 14.7%

In the absence of a carbohydrate, the precipitated polymer particles agglomerated during the polymerization. The system remained liquid under constant agitation, but rapidly separated once agitation was stopped. Within one hour after mixing was discontinued, the entire system separated into two phases; a clear brine layer and a solid polymer gel.

Comparative Example 3
20/40/38/2 AETAC/AM/DMAM/t-BAM Aqueaous Dispersion

|  | Grams |
|---|---|
| AETAC (80%) | 30.43 |
| Acrylamide (53%) | 33.72 |
| N,N-dimethyl acrylamide (99%) | 23.89 |
| N-tert-butyl acrylamide (99%) | 1.62 |
| DI Water | 254.34 |
| Ammonium Sulfate | 115.00 |
| Versenex 80 | 0.50 |
| Wako V-50 (1.0%) | 0.50 |
|  | 460.00 |
| Final Actives Content - 14.7% | |

In the absence of a carbohydrate, the precipitated polymer particles agglomerate during the polymerization. The system remains liquid under constant agitation, but rapidly separates when agitation is stopped. Within one hour after mixing is discontinued, the entire system separates into two phases yielding a clear brine layer and a polymer gel.

As can be seen from the preceding examples, using at least one carbohydrate in a dispersion reaction medium allows for the production of high molecular weight polymers in the form of a stable aqueous dispersion with low bulk viscosity. Active polymer contents up to 30% are expected to be achieved while maintaining a stable, pourable dispersion system. All of the dispersion polymers makedown readily in water to yield homogeneous polymer solutions.

X. Efficacy Tests

Polymer samples from the Examples above were evaluated using a Hydrite R clay settling test. This test was used to measure the increase in settling rate of a fine clay slurry induced by the addition of the polymer. This type of test has long been used as a screening tool to evaluate potential waste treatment polymers prior to testing on the actual waste water. The clay used to form a slurry (Hydrite R available from George Kaolin Co.) possesses a net anionic surface charge which causes the clay particulates to repel each other and resist settling. Addition of a cationic polymer to the slurry neutralizes the surface charge so that interparticle repulsion is reduced. The polymer also serves to bridge the neutralized particles to form larger agglomerates or "floc" which speeds the settling out of the clay. To investigate relative polymer performance, the settling rate of the clay is measured as a function of polymer dosage and compared to the settling rate observed in the absence of any polymer (blank rate).

Settling Rate (mm/sec) at Active Polymer Dosage

Blank 0.048 mm/sec

| | Polymer Dosage (ppm) | | | |
|---|---|---|---|---|
| Example No. | 6 | 9 | 15 | 21 |
| 1 | 3.3 | 4.5 | 7.3 | 10.3 |
| 2 | 3.4 | 5.3 | 11.5 | 17.9 |
| 3 | 3.3 | 5.1 | 7.2 | 11.7 |
| 4 | — | 3.3 | 3.9 | 4.9 |
| 5 | 3.8 | 4.7 | 6.5 | 10.0 |
| 6 | 2.1 | 5.4 | 12.6 | 18.0 |
| Emulsion Polymer A | — | 3.2 | 4.4 | 4.7 |
| Example No. | 24 | 27 | 30 | 33 | 42 |
| 1 | 11.8 | — | 17.3 | — | — |
| 2 | — | — | — | — | — |
| 3 | 13.7 | 15.4 | — | — | — |
| 4 | 5.4 | — | — | 8.7 | 14.5 |
| 5 | 12.2 | — | 17.0 | — | — |
| 6 | — | — | — | — | — |
| Emulsion Polymer A | 6.5 | — | — | 9.6 | 14.6 |

Emulsion Polymer A is an AETAC/AM copolymer commercially available from SNF Floerger, Inc.

The results of the clay settling test indicate a substantial increase in the setting rate of the clay in the presence of very low dosages of the dispersion polymers of the invention. In the absence of polymer, the clay settles at an extremely slow rate. The increase in settling rate when using the dispersion polymers of the invention is equivalent to or exceeds that of the conventional emulsion polymer on an actives basis.

Polymer samples from the above Examples were also evaluated by a Modified Buchner Funnel Test using a biological sludge taken from a Southeastern U.S. chemical plant. A portion of the substrate (200 cc) was dosed with the required amount of each polymer and mixed for 15 seconds to allow floc formation. The conditioned sludge was then discharged into a Buchner funnel containing a mesh screen allowing for drainage of the free water through the funnel and into a graduated cylinder. As the water drains, a sludge cake is formed on the screen. The volume of filtrate collected after 20 seconds of free drainage was recorded as a function of polymer dosage. The results were as follows:

Filtrate Collected (cc) After 20 seconds at Active Polymer Dosage (ppm)

| | Polymer Dosage (ppm) | | | |
|---|---|---|---|---|
| Example | 125 | 150 | 175 | 200 |
| 1 | — | — | — | 74/(3) |
| 2 | — | — | — | 86/(3) |
| 3 | 72/(3) | 100/(2) | 114/(1) | 112/(1) |
| 4 | — | — | 86/(3) | 96/(2) |
| 5 | 68/(3) | 95/(2) | 108/(1) | 106/(1) |
| Example | 225 | 250 | 275 | 300 | 350 |
| 1 | 130/(1) | 140/(1) | 152/(1) | 158/(1) | 168/(1) |
| 2 | 114/(1) | 148/(1) | 158/(1) | 160/(1) | 162/(1) |
| 3 | 124/(1) | 120/(1) | 120/(1) | — | — |
| 4 | 110/(1) | 108/(1) | 112/(1) | 134/(1) | 124/(1) |
| 5 | 138/(1) | 122/(1) | — | — | — | wherein the first number is cubic centimeters filtrate, using a rating system of (1) to (5) to rate the clarity of the filtrate, (1) denotes excellent filtrate clarity and (5) denotes very poor clarity and wherein the blank is 135 cc/(5).

The results of the Buchner funnel test indicate excellent dewatering efficacy for the dispersion polymers. The clarity of the filtrate was much better in the presence of the dispersion polymers, compared to the unconditioned sludge, indicating high solids capture.

Polymer samples from several of the Examples were also evaluated using a Standard Britt Jar Test to determine their effectiveness as retention aids for paper manufacture. A synthetic alkaline furnish was prepared consisting of a 70/30 blend of hardwood/softwood stock along with 20% and 0.5% by weight of precipitated calcium carbonate and cationically modified potato starch, respectively, as fillers. Evaluations were conducted by dosing 500 cc portions of the synthetic furnish (consistency=0.52%) with known concentrations of each polymer in the presence and absence of bentonite clay as a secondary retention aid. Following polymer addition, the treated furnish was subjected to shearing at 1200 rpm for 10 seconds. In the tests where bentonite clay was added, shearing at 1200 rpm was continued for another 10 seconds following the clay addition. Acid titration of the effluent collected from the Britt Jar then yielded the % calcium carbonate retained in the paper web. Retention performance was evaluated relative to the unconditioned furnish (blank). The results were as follows:

| | % Precipitated Calcium Carbonated Retained | |
|---|---|---|
| Example No. | 1.0 #/T active polymer | 1.0 #/T active polymer + 2.0 #/T Bentonite |
| 1 | 62.1% | 84.0% |
| 2 | 33.1% | 53.9% |
| 3 | 35.7% | 60.6% |
| 5 | 34.2% | 59.9% |
| Blank | 20.8% | — |

The results indicate increased filler retention in the presence of the dispersion polymers of the present invention. Enhanced retention is obtained when the polymers are used in combination with bentonite clay as part of a microparticle treatment system.

Thus the present invention provides water soluble, salt dispersible polymers, methods of making water soluble, salt dispersible polymers, and methods of using said polymers.

The invention polymers and polymeric dispersions do not require the presynthesis of seed polymers having benzyl quaternary repeating units or dispersant polymers having quaternary ammonium alkylate repeating units.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

We claim:

1. An aqueous dispersion comprising a water soluble polymer dispersed in an aqueous salt solution, said polymer obtained by polymerizing ethylenically unsaturated monomers selected from the group consisting of
   (i) N-alkyl acrylamides, N-alkyl methacrylamides, N,N-dialkyl acrylamides, N,N-dialkyl methacrylamides, alkyl acrylates, alkyl methacrylates and alkyl styrenes having 1 to 16 carbon atoms in the alkyl group and alkyl esters derived from the reaction of alkanols having from 1 to 16 carbon atoms in the alkyl group with ethylenically unsaturated carboxylic acids;
   (ii) monomers having the formula:

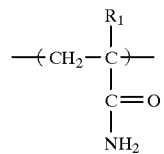

wherein $R_1$ is H or a $C_1$ to $C_3$ alkyl; and (iii) monomers having the formula:

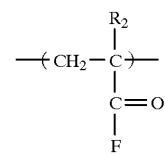

wherein $R_2$ is H or a $C_1$ to $C_3$ alkyl, F is a $NHR_3N+(R_{4,5,6})M—$ or $OR_3N+(R_{4,5,6})M—$, $R_3$ is a $C_1$ to $C_4$ linear or branched alkylene group, $R_4$, $R_5$, and $R_6$ are hydrogen, $C_1$ to $C_4$ linear or branched alkyl groups, $C_5$ to $C_8$ cycloalkyl groups, aromatic or alkylaromatic groups, and $M—$ is chloride, bromide, fluoride, iodide or methyl or hydrogen sulfate in an aqueous salt solution comprising at least one carbohydrate, salt, water, a polymerization initiator, a compound selected from the group consisting of tannin, cationically modified tannin, reaction products of tannin with formaldehyde and amines, and mixtures thereof, and optionally a crosslinking agent and with the proviso that at least one of said ethylenically unsaturated monomers is a monomer of (ii) or (iii).

2. The dispersion of claim 1 wherein said polymer has a number average molecular weight from 5,000 to about 20,000,000.

3. The dispersion of claim 1 wherein said carbohydrate is a monosaccharide, a disaccharide, or a polysaccharide.

4. The dispersion of claim 3 wherein said polysaccharide is a starch, a cellulose, a gum, a chitin or a mixture thereof.

5. The dispersion of claim 3 wherein said polysaccharide is a starch or a mixture of starches.

6. The dispersion of claim 5 wherein said starch is hydroxyalkyl starch, a functional amine modified starch or a cationically modified starch.

7. The dispersion of claim 4 wherein said polysaccharide is a gum or mixture of gums.

8. The dispersion of claim 7 wherein said gum is a mannan, galactomannan, glucomannan, agar, a carragenan gum, an algin, an alginic acid, gum Arabic, gum Karaya, gum Tragacanth, gum Ghaltic, guar gum, locust bean gum, dextrin, xanthain gum, methoxyl pectin, propylene glycolalginate, triethanolamine alginate, carboxymethyl locust bean gum or carboxymethyl guar gum or a cationically modified guar gum.

9. The dispersion of claim 4 wherein said polysaccharide is a cellulose or a mixture of celluloses.

10. The dispersion of claim 9 wherein said cellulose is a cellulose ester or a cellulose ether.

11. The dispersion of claim 9 wherein said cellulose is cellulose formate, cellulose acetate, cellulose propionate, cellulose butyrate, cellulose valerate, cellulose caproate, cellulose heptylate, cellulose caprate, cellulose laurate, cellulose myristate, cellulose palmitate, sodium carboxymethylcellulose, hydroxymethylcellulose, hydrophobically modified hydroxymethylcellulose, hydroxyethylcellulose or hydrophobically modified hydroxyethylcellulose.

12. The dispersion of claim 3 wherein said polysaccharide is a chitosan.

13. The dispersion of claim 1 wherein said aqueous salt solution is comprised of a monovalent metal salt, a polyvalent metal salt or a mixture thereof in water.

14. The dispersion of claim 1 wherein said aqueous salt solution contains anions selected from the group consisting of chloride, bromide, fluoride, sulfate and phosphate and cations selected from the group consisting of ammonium, sodium, potassium, magnesium, and aluminum.

15. The dispersion of claim 1 wherein said aqueous salt solution contains ammonium sulfate.

16. The dispersion of claim 1 further comprising a polymerization initiator.

17. The dispersion of claim 16 wherein the polymerization initiator is selected from the group consisting of peroxides, persulfates, bromates, azoalkylaminohydrohalides, sulfites, bisulfites, sulfur dioxides, citrates and mixtures thereof.

18. The dispersion of claim 16 wherein the polymerization initiator is 2,2'-azobis(2-amidinopropane) dihydrochloride.

19. The dispersion of claim 1 further comprising a branching agent.

20. The dispersion of claim 19 wherein said branching agent is selected from the group consisting of polyethylene glycol di(meth)acrylate, methylene bis(meth) acrylamide, N-vinyl acrylamide, allyl glycidylether and glycidylacrylate.

21. The dispersion of claim 1 wherein said tannin is derived from quebracho, mimosa, sumac or a mixture thereof.

22. The dispersion of claim 1 wherein said cationically modified tannin is obtained by reacting tannin with methyl chloride, benzyl chloride, and dimethyl sulfate quaternary salts of dimethylaminoethyl acrylate, diethylaminoethyl acrylate, dimethyl aminoethyl methacrylate, diethylaminoethyl methacrylate, dimethylaminopropyl acrylamide and dimethylaminopropyl methacrylamide or diallyl dimethyl ammonium chloride.

23. An aqueous dispersion comprising a water soluble, aqueous salt solution dispersible polymer dispersed in an aqueous salt solution, said polymer obtained by polymerization of unsaturated monomers selected from the group consisting of (i) N-alkyl acrylamides, N-alkyl methacrylamides, N,N-dialkyl acrylamides, N,N-dialkyl methacrylamides, alkyl acrylates, alkyl methacrylates and alkyl styrenes having 1 to 16 carbon atoms in the alkyl group and alkyl esters derived from the reaction of alkanols having from 1 to 16 carbon atoms in the alkyl group with ethylenically unsaturated carboxylic acids;

(ii) monomers having the formula:

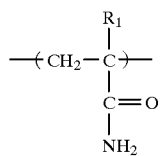

wherein $R_1$ is H or a $C_1$ to $C_3$ alkyl; and
(iii) monomers having the formula:

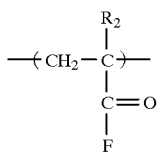

wherein $R_2$ is H or a $C_1$ to $C_3$ alkyl, F is a $NHR_3N+(R_{4,5,6})M—$ or $OR_3N+(R_{4,5,6})M—$, $R_3$ is a $C_1$ to $C_4$ linear or branched alkylene group, $R_4$, $R_5$, and $R_6$ are hydrogen, $C_1$ to $C_4$ linear or branched alkyl groups, $C_5$ to $C_8$ cycloalkyl groups, aromatic or alkylaromatic groups, and M— is chloride, bromide, fluoride, iodide or methyl or hydrogen sulfate in said aqueous salt solution in the presence of at least one carbohydrate and a compound selected from the group consisting of tannin, cationically modified tannin, reaction products of tannin with formaldehyde and amines, and mixtures thereof, wherein said aqueous salt solution is free of seed polymers having benzyl quaternary repeating units or dispersant polymers having quaternary ammonium alkylate repeating units and with the proviso that at least one of said ethylenically unsaturated monomers is a monomer of (ii) or (iii).

24. A process for producing a water soluble, aqueous salt solution dispersible polymer dispersed in an aqueous salt solution, said process comprising polymerizing unsaturated monomers selected from the group consisting of (i) N-alkyl acrylamides, N-alkyl methacrylamides, N,N-dialkyl acrylamides, N,N-dialkyl methacrylamides, alkyl acrylates, alkyl methacrylates and alkyl styrenes having 1 to 16 carbon atoms in the alkyl group and alkyl esters derived from the reaction of alkanols having from 1 to 16 carbon atoms in the alkyl group with ethylenically unsaturated carboxylic acids;

(ii) monomers having the formula:

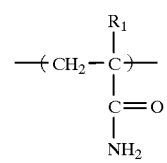

wherein $R_1$ is H or a $C_1$ to $C_3$ alkyl; and
(iii) monomers having the formula:

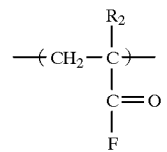

wherein $R_2$ is H or a $C_1$ to $C_3$ alkyl, F is a $NHR_3N+(R_{4,5,6})M—$ or $OR_3N+(R_{4,5,6})M—$, $R_3$ is a $C_1$ to $C_4$ linear or branched alkylene group, $R_4$, $R_5$, and $R_6$ are hydrogen, $C_1$ to $C_4$ linear or branched alkyl groups, $C_5$ to $C_8$ cycloalkyl groups, aromatic or alkylaromatic groups, and M— is chloride, bromide, fluoride, iodide or methyl or hydrogen sulfate in an aqueous salt solution in the presence of at least one carbohydrate and a compound selected from the group consisting of tannin, cationically modified tannin, reaction products of tannin with formaldehyde and amines, and mixtures thereof, wherein said aqueous salt solution is free of seed polymers having benzyl quaternary repeating units or dispersant polymers having quaternary ammonium alkylate repeating units and with the proviso that at least one of said ethylenically unsaturated monomers is a monomer of (ii) or (iii).

25. A process for producing a water soluble, aqueous salt solution dispersible polymer dispersed in an aqueous salt solution, said process comprising polymerizing ethylenically unsaturated monomers selected from the group consisting of (i) N-alkyl acrylamides, N-alkyl methacrylamides, N,N-dialkyl acrylamides, N,N-dialkyl methacrylamides, alkyl acrylates, alkyl methacrylates and alkyl styrenes having 1 to 16 carbon atoms in the alkyl group and alkyl esters derived from the reaction of alkanols having from 1 to 16 carbon atoms in the alkyl group with ethylenically unsaturated carboxylic acids;

(ii) monomers having the formula:

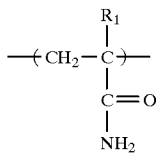

wherein $R_1$ is H or a $C_1$ to $C_3$ alkyl; and (iii) monomers having the formula:

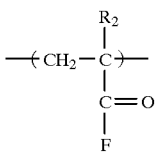

wherein $R_2$ is H or a $C_1$ to $C_3$ alkyl, F is a $NHR_3N+(R_{4,5,6})M-$ or $OR_3N+(R_{4,5,6})M-$, $R_3$ is a $C_1$ to $C_4$ linear or branched alkylene group, $R_4$, $R_5$ and $R_6$ are hydrogen, $C_1$ to $C_4$ linear or branched alkyl groups, $C_5$ to $C_8$ cycloalkyl groups, aromatic or alkylaromatic groups, and M— is chloride, bromide, fluoride, iodide or methyl or hydrogen sulfate in an aqueous salt solution comprising at least one carbohydrate, at least one tannin compound selected from the group consisting of tannin, cationically modified tannin, and reaction products of tannin with formaldehyde and amines, salt, a polymerization initiator and water, with the proviso that at least one of said ethylenically unsaturated monomers is a monomer of (ii) or (iii).

26. A process for producing a water soluble, aqueous salt solution dispersible polymer dispersed in an aqueous salt solution, said process comprising polymerizing:

a) from about 0 to 60 mole percent of a monomer selected from the group consisting of (i) N-alkyl acrylamides, N-alkyl methacrylamides, N,N-dialkyl acrylamides, N,N-dialkyl methacrylamides, alkyl acrylates, alkyl methacrylates and alkyl styrenes having 1 to 16 carbon atoms in the alkyl group and alkyl esters derived from the reaction of alkanols having from 1 to 16 carbon atoms in the alkyl group with ethylenically unsaturated carboxylic acids;

b) from about 20 to 95 mole percent of a monomer selected from the group consisting of acrylamide and $C_1$ to $C_3$ alkyl acrylamides; and c) from about 5 to 80 mole percent of monomers selected from the group consisting of monomers having the formula

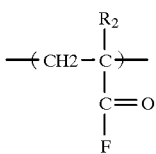

wherein $R_2$ is H or a $C_1$ to $C_3$ alkyl, F is a $NHR_3N+(R_{4,5,6})M-$ or $OR_3N+(R_{4,5,6})M-$, $R_3$ is a $C_1$ to $C_4$ linear or branched alkylene group, $R_4$, $R_5$ and $R_6$ are hydrogen, $C_1$ to $C_4$ linear or branched alkyl groups, $C_5$ to $C_8$ cycloalkyl groups, aromatic alkylaromatic groups, and M— is chloride, bromide, fluoride, iodide or methyl or hydrogen sulfate, with the proviso that the sum of the molar percentages of a), b), and c) equal 100 mole percent, in a solution comprising from about 0.01 to 10 percent by weight of at least one carbohydrate, from about 0.005 weight percent to 5 weight percent a tannin compound selected from the group consisting of tannin, cationically modified tannin, reaction products of tannin with formaldehyde and amines, or mixtures thereof, and from about 15 percent by weight of at least one salt in water wherein said percentages are based on the total weight of said dispersion.

27. The process of claim 26 wherein said carbohydrate is a monosaccharide, a disaccharide, or a polysaccharide.

28. The process of claim 27 wherein said polysaccharide is a starch, a cellulose, a gum, a chitin or a mixture thereof.

29. The process of claim 27 wherein said polysaccharide is a starch or a mixture of starches.

30. The process of claim 29 wherein said starch is hydroxyalkyl starch, a functional amine modified starch or a cationically modified starch.

31. The process of claim 27 wherein said polysaccharide is a gum or mixture of gums.

32. The process of claim 31 wherein said gum is a mannan, galactomannan, glucomannan, agar, a carragenan gum, an algin, an alginic acid, gum Arabic, gum Karaya, gum Tragacanth, gum Ghaltic, guar gum, locust bean gum, dextrin, xanthain gum, low methoxyl pectin, propylene glycolalginate, triethanolamine alginate, carboxymethyl locust bean gum, carboxymethyl guar gum or a cationically modified guar gum.

33. The process of claim 27 wherein said polysaccharide is a cellulose or a mixture of celluloses.

34. The process of claim 33 wherein said cellulose is a cellulose ester or a cellulose ether.

35. The process of claim 33 wherein said cellulose is cellulose formate, cellulose acetate, cellulose propionate, cellulose butyrate, cellulose valerate, cellulose caproate, cellulose heptylate, cellulose caprate, cellulose laurate, cellulose myristate, cellulose palmitate, sodium carboxymethylcellulose, hydroxymethylcellulose or hydophobically modified hydroxymethylcellulose, hydroxyethylcellulose and hydrophobically modified hydroxyethylcellulose.

36. The dispersion of claim 27 wherein said polysaccharide is a chitosan.

37. The process of claim 26 wherein said salt is comprised of a monovalent metal salt, a polyvalent metal salt or a mixture thereof in water.

38. The process of claim 26 wherein said salt is a salt having anions selected from the group consisting of chloride, bromide, fluoride, sulfate and phosphate and cations selected from the group consisting of ammonium, sodium, potassium, magnesium, and aluminum.

39. The process of claim 26 wherein said salt is comprised of ammonium sulfate.

40. The process of claim 26 wherein said solution further comprises from about 5 ppm to 1000 ppm of polymerization initiator based on the total weight of the monomer.

41. The process of claim 40 wherein said polymerization initiator is selected from the group consisting of peroxides, persulfates, bromates, azoalkylaminohydrohalides, sulfites, bisulfites, sulfur dioxides, citrates and mixtures thereof.

42. The dispersion of claim 41 wherein the polymerization initiator is 2,2'-azobis(2-amidinopropane) dihydrochloride.

43. The process of claim 26 wherein said solution further comprises a branching agent.

44. The process of claim 43 wherein said branching agent is selected from the group consisting of polyethylene glycol di(meth)acrylate, methylene bis (meth) acrylamide, N-vinyl acrylamide, allyl glycidylether and glycidylacrylate.

45. The process of claim 26 wherein said tannin is derived from quebracho, mimosa, sumac or a mixture thereof.

46. The process of claim 26 wherein said cationically modified tannin is obtained by reacting tannin with methyl chloride, benzyl chloride and dimethyl sulfate quaternary salts of dimethylaminoethyl acrylate, diethylaminoethyl acrylate, dimethyl aminoethyl methacrylate, diethylaminoethyl methacrylate, dimethylaminopropyl acrylamide and dimethylaminopropyl methacrylamide or diallyl dimethyl ammonium chloride.

47. A process for producing a water soluble, aqueous salt solution polymer dispersed in an aqueous salt solution, said process comprising polymerizing:

a) from about 0 to 40 mole percent of a monomer selected from the group consisting of (i) N-alkyl acrylamides, N-alkyl methacrylamides, N,N-dialkyl acrylamides, N,N-dialkyl methacrylamides, alkyl acrylates, alkyl methacrylates and alkyl styrenes having 1 to 16 carbon atoms in the alkyl group and alkyl esters derived from the reaction of alkanols having from 1 to 16 carbon atoms in the alkyl group with ethylenically unsaturated carboxylic acids;

b) from about 20 to 80 mole percent of a monomer selected from the group consisting of acrylamide and $C_1$ to $C_3$ N-alkyl acrylamides; and c) from about 5 to 80 mole percent of monomers selected from the group consisting of monomers having the formula

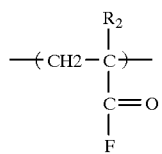

wherein $R_2$ is H or a $C_1$ to $C_3$ alkyl, F is a $NHR_3N+(R_{4,5,6})M—$ or $OR_3N+(R_{4,5,6})M—$, $R_3$ is a $C_1$ to $C_4$ linear or branched alkylene group, $R_4$, $R_5$ and $R_6$ are hydrogen, $C_1$ to $C_4$ linear or branched alkyl groups, $C_5$ to $C_8$ cycloalkyl groups, aromatic alkylaromatic groups, and M— is chloride, bromide, fluoride, iodide or methyl or hydrogen sulfate, with the proviso that the sum of the molar percentages of a), b), and c) equal 100 mole percent, in a solution comprising from about 0.01 to 10 percent by weight of at least one carbohydrate, from about 0.005 weight percent to 5 weight percent a tannin compound selected from the group consisting of tannin, cationically modified tannin reaction products of tannin with formaldehyde and amines, or mixtures thereof, and from about 15 percent by weight of at least one salt in water wherein said percentages are based on the total weight of said dispersion.

48. An aqueous dispersion comprising a water soluble, aqueous salt solution dispersible polymer dispersed in an aqueous salt solution, said polymer having the structure:

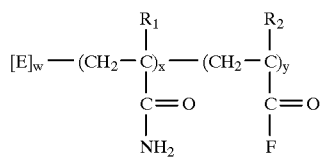

where E represents N-alkyl acrylamides, N-alkyl methacrylamides, N,N dialkyl acrylamides, N,N dialkyl methacrylamides, alkyl acrylates, alkyl methacrylates and alkylstyrenes having 1 to 16 carbon atoms in the alkyl group and alkyl esters derived from the reaction of alkanols having from 1 to 16 carbon atoms in the alkyl group with ethylenically unsaturated carboxylic acids; $R_1$ is H or a $C_{1\ to\ C3}$ alkyl; $R_2$ is H or a $C_1$ to $C_3$ alkyl; F is a $NHR_3N+(R_{4,5,6})M—$ or $OR_3N+(R_{4,5,6})M—$, $R_3$ is a $C_1$ to $C_4$ linear or branched alkylene group, $R_4$, $R_5$ and $R_6$ are hydrogen, $C_1$ to $C_4$ linear or branched alkyl groups, $C_5$ to $C_8$ cycloalkyl groups, aromatic or alkylaromatic groups, and M— is chloride, bromide, fluoride, iodide or methyl or hydrogen sulfate; with the proviso that the sum of the molar percentages of w, x and y must add up to 100 molar percent, and wherein said polymer is obtained by polymerizing unsaturated monomers in an aqueous salt solution comprising at least one carbohydrate, salt, water, a polymerization initiator, a compound selected from the group consisting of tannin, cationically modified tannin, reaction products of tannin with formaldehyde and amines, and mixtures thereof, and optionally a crosslinking agent.

* * * * *